Figure 1:
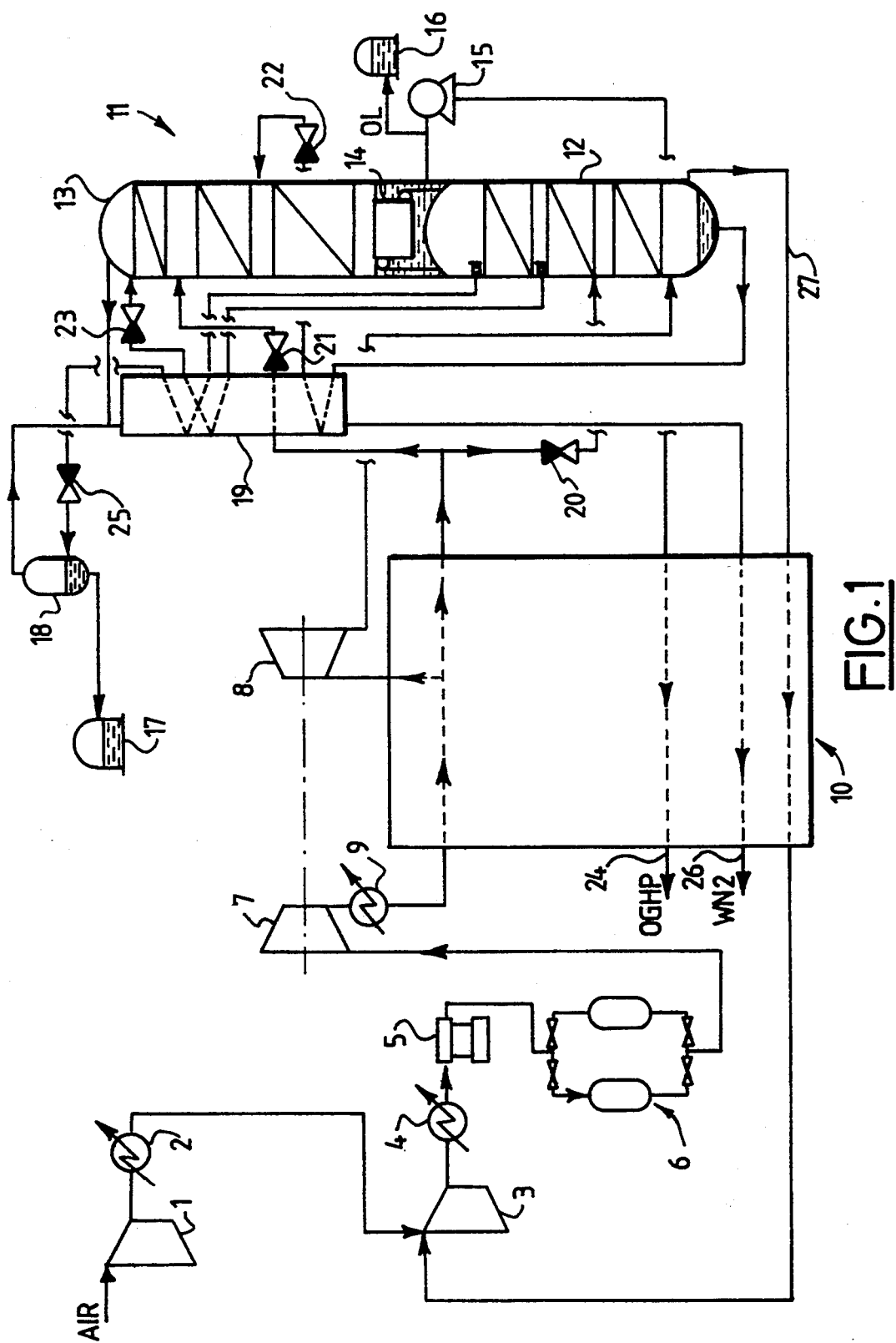

United States Patent [19]

Darredeau et al.

[11] Patent Number: 5,412,953
[45] Date of Patent: May 9, 1995

[54] PROCESS AND INSTALLATION FOR THE PRODUCTION OF GASEOUS OXYGEN AND/OR GASEOUS NITROGEN UNDER PRESSURE BY DISTILLATION OF AIR

[75] Inventors: Bernard Darredeau, Sartrouville; Catherine Garnier; Alain Guillard, both of Paris; Philippe Fraysse, Fontenay aux Roses; Jean-Yves Lehman, Maisons Alfort; Norbert Rieth, Paris, all of France

[73] Assignee: L'Air Liquide, Societe Anonyme pour l'Etude et l'Exploitation des Procedes Georges Claude, Paris, France

[21] Appl. No.: 214,296

[22] Filed: Mar. 17, 1994

[30] Foreign Application Priority Data

Mar. 23, 1993 [FR] France .................. 93 03295

[51] Int. Cl.6 .................................... F25J 3/02
[52] U.S. Cl. .................................... 62/25; 62/38; 62/41
[58] Field of Search .................. 62/25, 38, 40, 41

[56] References Cited

U.S. PATENT DOCUMENTS

| 4,853,015 | 8/1989 | Yoshino | 62/40 |
|---|---|---|---|
| 5,251,449 | 10/1993 | Rottmann | 62/41 |
| 5,329,776 | 7/1994 | Grenier | 62/25 |
| 5,337,571 | 8/1994 | Ducrocq et al. | 62/41 |
| 5,341,647 | 8/1994 | Koeberle et al. | 62/41 |

FOREIGN PATENT DOCUMENTS

| 0316768 | 5/1989 | European Pat. Off. . |
|---|---|---|
| 2278047 | 2/1976 | France . |
| 2681415 | 3/1993 | France . |
| 3814187 | 11/1989 | Germany . |
| 2251931 | 7/1972 | United Kingdom . |

Primary Examiner—Ronald C. Capossela
Attorney, Agent, or Firm—Young & Thompson

[57] ABSTRACT

Process and installation for the production of gaseous oxygen and/or gaseous nitrogen under pressure, of the type in which air is distilled in a double distillation column (11) comprising a low pressure column (13) operating under a so-called low pressure, and a medium pressure column (12) operating under a so-called medium pressure. All the air to be distilled is compressed (in 1, 3, 7) to at least one high air pressure substantially greater than the medium pressure, and the compressed air is cooled to an intermediate temperature, and a portion of it is expanded in a turbine (8) to the medium pressure, before introducing it into the medium pressure column (12). The air which has not been expanded is liquefied, then introduced after expansion (in 20, 21), into the double column. At least one liquid product withdrawn from the double column is brought to the production pressure, and this liquid product is vaporized by heat exchange with at least one portion of the air to be distilled in the course of cooling. An additional cycle fluid withdrawn from the double column (11) or destined for this latter, is reheated, compressed (in 3; 30, 31) to a high cycle pressure, cooled, a fraction thereof expanded (in 8; 35) with the production of external work, and the rest of the compressed additional cycle fluid is liquefied.

11 Claims, 3 Drawing Sheets 5,412,953

PROCESS AND INSTALLATION FOR THE PRODUCTION OF GASEOUS OXYGEN AND/OR GASEOUS NITROGEN UNDER PRESSURE BY DISTILLATION OF AIR

The present invention relates to a process for the production of gaseous oxygen and/or gaseous nitrogen under pressure, of the type in which:

air is distilled in a double distillation column comprising a low pressure column operating at a so-called low pressure, and a medium pressure column operating at a so-called medium pressure;

all the air to be distilled is compressed to at least one high air pressure substantially greater than the medium pressure;

the compressed air is cooled to an intermediate temperature, and a portion thereof is expanded in a turbine to the medium pressure, before introducing it into the medium pressure column;

the air not expanded is liquefied, then introduced, after expansion, into the double column; and at least one liquid product withdrawn from the double column is brought to the production pressure, and this liquid product is vaporized by heat exchange with at least a portion of the air to be distilled in the course of cooling.

The pressures in question in the present text are absolute pressures. Moreover, the expression "liquefaction" or "condensation" should be understood in the broad sense, which is to say including pseudo-liquefaction or pseudo-condensation in the case of supercritical pressures.

A process of the above type is described in FR-A-2 674 011.

The invention has for its object to permit adjusting as desired, in an economical way, a production of liquid simultaneously with the production of gas under pressure.

To this end, the invention has for its object a process of the recited type, characterized in that an additional cycle fluid withdrawn from the double column or directed toward the latter, is heated, compressed to a high pressure of the cycle, cooled, a fraction thereof expanded with the production of external work, and the rest of the compressed additional cycle fluid is liquefied.

According to other characteristics:

the additional cycle fluid is air under the medium pressure which is mixed, after its reheating, with the air to be distilled precompressed to this medium pressure, the mixture being then compressed to said high pressure;

the precompressed air to be distilled is mixed with the recycled air before being purified, and the mixture is compressed to said high pressure and then purified of water and carbon dioxide at this high pressure;

the precompressed air to be distilled is purified of water and carbon dioxide before its mixture with the recycled air;

the additional fluid of the cycle is nitrogen withdrawn from the head of at least one of the two columns, the expanded fraction of this nitrogen being reheated while its liquefied fraction is reintroduced into the double column or recovered as product.

The invention also has for its object an installation adapted to practice such a process. This installation, of the type comprising a double distillation column comprising a low pressure column operating under a so-called low pressure, and a medium pressure column operating under a so-called medium pressure; compression means to bring all the air to be distilled to at least one high pressure substantially greater than the medium pressure; means for withdrawing from the double column and pumping at least one liquid product resulting from the distillation; a heat exchange line placing in heat exchange relationship said liquid product and at least one portion of the air to be distilled in the course of cooling; and a principal expansion turbine for a portion of this air, the inlet of this turbine being connected to an intermediate point in the heat exchange line and its outlet being connected to the medium pressure column, is characterized in that it comprises a cycle compressor and in that the heat exchange line comprises passages for reheating an additional cycle fluid withdrawn from the double column or destined for the latter, connected to the intake of the cycle compressor, cooling passages for the compressed additional cycle fluid, connected to the delivery of the cycle compressor, and a cycle turbine for expanding a portion of the additional cycle fluid, whose inlet is connected to an intermediate point of these cooling passages.

According to other characteristics of the installation:

the inlet of the reheating passages is connected to the base of the medium pressure column, and their outlet is connected to the intake of a second air compressor constituting said cycle compressor, said intake being also connected to the output of an air precompressor, said principal turbine constituting also the cycle turbine;

an apparatus for purification of air by adsorption is mounted at the output of the second air compressor;

an apparatus for purifying air by adsorption is mounted between the air precompressor and the second air compressor;

the inlet of the reheating passages is connected to the head of the medium pressure column and/or to that of the low pressure column, the outlet of the cooling passages being connected to the double column via an expansion valve;

a refrigeration group for precooling a portion of the cycle nitrogen is mounted at the output of the final cycle compressor.

Examples of embodiment of the invention will now be described with regard to FIGS. 1–3, which show respectively, in a schematic fashion, three embodiments of the installation according to the invention.

The installation shown in FIG. 1 is adapted to produce gaseous oxygen under a high pressure of about 3 to 100 bars, liquid oxygen and liquid nitrogen.

This installation comprises essentially: a principal air precompressor 1, or medium pressure compressor, provided at its outlet with an atmospheric or water refrigerant 2; a second principal air compressor 3, provided at its outlet with an atmospheric or water refrigerant 4; if desired a refrigerating group 5; an apparatus 6 for purification by adsorption; a blower-turbine assembly comprising a blower 7 and a turbine 8 whose rotors are secured to the same shaft; an atmospheric or water refrigerant 9 for the blower; a heat exchange line 10; a double distillation column 11 comprising a medium pressure column 12 and a low pressure column 13 coupled by a vaporizer-condenser 14 which places in heat exchange relationship the nitrogen at the head of the column 12 and the liquid oxygen in the base of the column 13; a liquid oxygen pump 15; a storage 16 for liquid oxygen at atmospheric pressure; a storage 17 for liquid nitrogen at atmospheric pressure; a phase separator 18; and a subcooler 19.

In operation, the column 13 is under a pressure slightly greater than 1 bar and the column 12 under the corresponding pressure of about 5.5 bars.

All the air to be distilled is compressed in 1 to the medium pressure, then again compressed in 3, precooled in 4 and 5 to +5° to +10° C., purified of water and carbon dioxide in 6 and further compressed in 7 to the high pressure. After precooling in 9 and then partial cooling in 10 to an intermediate temperature T1, a portion of the air under the high pressure continues its cooling in the heat exchange line, is liquefied then divided into two fractions. Each fraction is expanded in a respective expansion valve 20, 21, and then introduced into the respective column 12, 13.

At temperature T1, the rest of the air under the high pressure is withdrawn from the heat exchange line, work expanded in 8 to the medium pressure and introduced into the base of the column 12.

In a conventional manner, "rich liquid" (air enriched in oxygen) withdrawn from the base of the column 12 and "poor liquid" (somewhat pure nitrogen) withdrawn at the head of this column are, after subcooling in 19 and expansion in respective expansion valves 22 and 23, introduced into an intermediate level and into the head, respectively, of the column 13.

Liquid oxygen is withdrawn from the base of the column 13. A fraction goes directly to the storage 16, while the rest is brought by the pump 15 to the desired high production pressure, then vaporized and reheated to ambient temperature in the heat exchange line before being recovered via a conduit 24.

Moreover, the liquid nitrogen under the medium pressure, withdrawn from the head of the column 12, is subcooled in 19, expanded to atmospheric pressure in an expansion valve 25, and introduced into the phase separator 18. The liquid phase is sent to the storage 17, while the vapor phase is combined with the impure nitrogen from the head of the column 13, reheated in 19 then in 10 and evacuated from the installation, as residual gas, via a conduit 36.

Moreover, air in a quantity that can be as much as about 20% of the entering air, is withdrawn from the base of the column 12 via a conduit 27, reheated to ambient temperature in 10 and returned to the intake of compressor 3, where it mixes with the medium pressure air from the compressor 1.

Thus the compressor 3, the refrigeration group 5, the purification apparatus 6 and the blower 7 treat the flow of air entering the installation augmented by the flow of air recycled via the conduit 27, and the turbine 8 constitutes both the Claude cycle turbine for the entering air and the cycle turbine of the recycled air. It will thus be understood that the recycled air serves on the one hand to supply, by its expansion in 8, the cold necessary for the production of large quantities of liquid, 5 and, by its liquefaction in 10, to vaporize the liquid oxygen.

In this manner, it is possible, by simple adjustment of the flow rate of recycled air, to vary as desired the production of liquid (liquid oxygen and/or liquid nitrogen) of the installation, and this with a substantially constant specific energy for the liquid.

By way of numerical example, the high pressure oxygen can be at 40 bars, with a purity of the order of 99.5%, the output pressure of the compressor 3 being 27 bars and that of the further compressor 7 being 35 bars.

In a general manner, the high pressure of the oxygen can be comprised between about 3 and 100 bars, and there can be produced in an analogous fashion gaseous nitrogen under a high pressure comprised between about 7 and 100 bars. Moreover, the vaporization of the liquid or liquids can take place at temperatures equal to or substantially greater than those corresponding to the condensation of air, according to the teaching of FR-A-2 674 011 cited above. Likewise, it is possible to produce oxygen and/or nitrogen under several pressures, by using several high air pressures.

Figure 2:
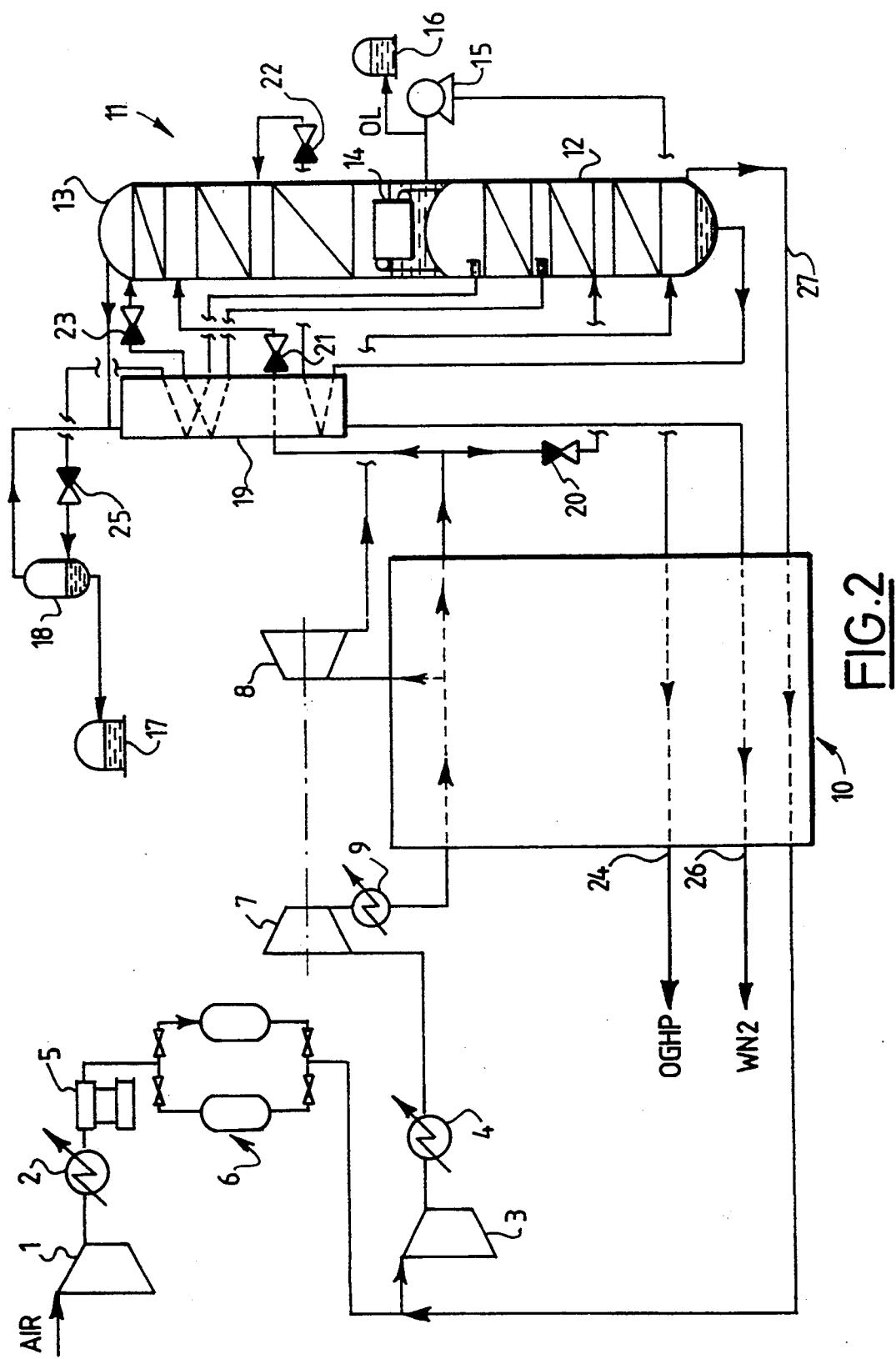

The installation shown in FIG. 2 differs from that of FIG. 1 only by the fact that the assembly of refrigeration group 5 and purification apparatus 6 is mounted between the refrigerator 2 and the compressor 3. As a result, the apparatus 6 treats only the flow of entering air, and this at medium pressure, and the compressor 3 treats the dried and carbon dioxide-free air. Calculation shows that one or the other of the arrangements of FIGS. 1 and 2 can constitute the optimum economy, according to the parameters of the process.

Figure 3:
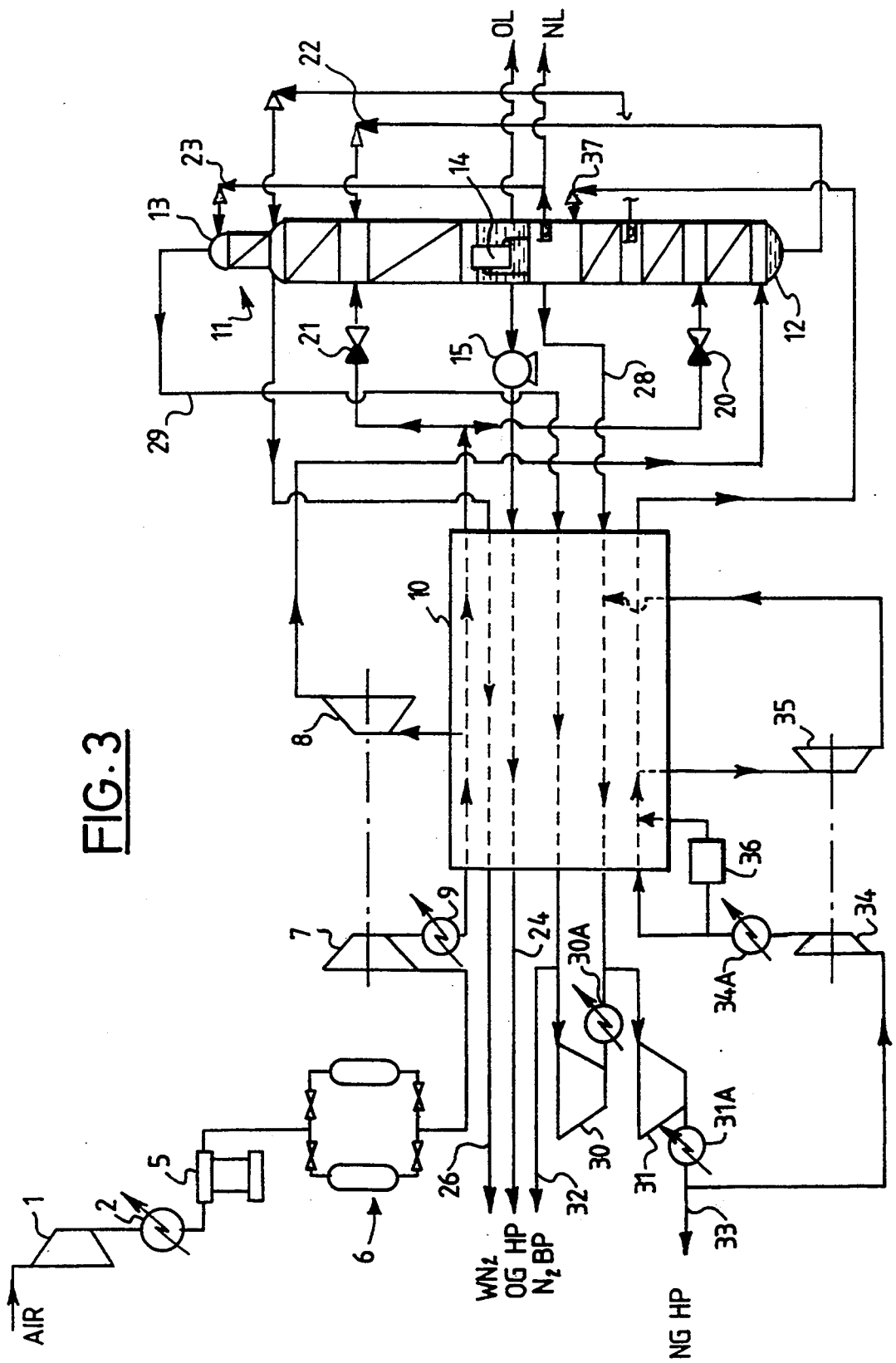

In the embodiment of FIG. 3, in which the elements 16 to 19 are not shown, the recycled fluid is nitrogen, withdrawn in part from the head of the medium pressure column 12 via a conduit 28, and in part via a conduit 29 from the head of the low pressure column 13, which is of the "minaret" type, which is to say producing at the head practically pure nitrogen. As a result, the conduit 27 of FIG. 1 is omitted, as well as the compressor 3 and its refrigerant 4, and the compressor 1 alone brings all of the entering air to the pressure which previously was the outlet pressure of compressor 3.

The low pressure nitrogen is reheated in 10 then compressed to the medium pressure by a first cycle compressor 30 followed by a refrigerant 30A and combined with the medium pressure nitrogen also reheated in 10. The two medium pressure nitrogen flows are compressed to a high cycle pressure by a second cycle compressor 31 followed by a refrigerant 31A. The reheated low pressure nitrogen can be partially recovered as product via a conduit 32, and likewise, the high pressure nitrogen from the compressor 31 can be partially recovered as product via a conduit 33. The rest of the nitrogen from the compressor 33 is further compressed by a blower 34 followed by a refrigerant 34A and coupled to an expansion turbine 35. The further compressed nitrogen, of which a fraction is preferably precooled by a refrigeration group 36, is cooled in 10 to an intermediate temperature T2; at this temperature, a fraction is withdrawn from the heat exchange line, expanded in 35 to the medium pressure and reintroduced into the reheating passages of the medium pressure nitrogen cycle. The high pressure nitrogen which is not expanded continues its cooling and is liquefied, to the cold end of the heat exchange line, then is expanded to the medium pressure in an expansion valve 37 and introduced into the head of the column 12.

Again, the adjustment of the flow rates of the nitrogen used as additional cycle fluid and the high cycle pressure permits varying within wide ranges the liquid production of the installation, and also permits optimizing the energy expenditure. Moreover, the integration of the nitrogen cycle into the heat exchange line 10 permits obtaining this result with only a moderate investment.

Of course, the integrated nitrogen cycle can comprise several expansion turbines in parallel, so as to optimize the energy efficiency.

What is claimed is:

1. In a process for the production of at least one of gaseous oxygen and gaseous nitrogen under pressure, comprising:

distilling air in a double distillation column comprising a low pressure column operating under a low pressure and a medium pressure column operating under a medium pressure;

compressing all the air to be distilled to at least one high air pressure substantially greater than the medium pressure;

cooling the compressed air to an intermediate temperature, and expanding a portion of the cooled air in a turbine to the medium pressure, and then introducing the cooled and expanded air into the medium pressure column;

liquefying the air which has not been expanded and introducing the same after expansion into the double column; and bringing at least one liquid product withdrawn from the double column to the production pressure, and vaporizing this liquid product by heat exchange with at least one portion of the air to be distilled in the course of cooling;

the improvement comprising withdrawing an additional cycle fluid from a point downstream of said cooling, compressing the same to a high cycle pressure, cooling the same, expanding a fraction thereof with the production of external work, and liquefying the rest of the compressed additional cycle fluid.

2. Process according to claim 1, wherein the additional cycle fluid is air under the medium pressure which is mixed, after reheating, with the air to be distilled precompressed to this medium pressure, the mixture being then compressed to said high pressure.

3. Process according to claim 2, wherein the air to be distilled, precompressed is mixed with the recycled air, and the mixture is compressed to said high pressure then purified of water and carbon dioxide at this high pressure (FIG. 1).

4. Process according to claim 2, wherein the air to be distilled, precompressed is purified of water and carbon dioxide before its mixture with the recycled air (FIG. 2).

5. Process according to claim 1, wherein the additional cycle fluid is nitrogen withdrawn from the head of at least one of the two columns, the expanded fraction of this nitrogen being reheated while its liquefied fraction is reintroduced into the double column or recovered as product.

6. In an installation for the production of at least one of gaseous oxygen and gaseous nitrogen under pressure, comprising a double distillation column comprising a low pressure column operating under a low pressure, and a medium pressure column operating under a medium pressure; compression means to bring all the air to be distilled to at least one high pressure substantially greater than the medium pressure; means for withdrawing from the double column and for pumping at least one liquid product resulting from the distillation; a heat exchange line placing in heat exchange relation said liquid product and at least a portion of the air to be distilled in the course of cooling; and a principal turbine for expansion of a portion of said air, the inlet of said turbine being connected to an intermediate point in the heat exchange line and the outlet of said turbine being connected to the medium pressure column; the improvement wherein the installation further comprises a cycle compressor and the heat exchange line comprises passages for reheating an additional cycle fluid withdrawn from a point in the cycle downstream of the heat exchange line, connected to the intake of the cycle compressor, cooling passages for the compressed additional cycle fluid, connected to the output of the cycle compressor, and a cycle turbine to expand a portion of the additional cycle fluid, said cycle turbine having an inlet connected to an intermediate point in the cooling passages.

7. Installation according to claim 6, wherein the inlet of the reheating passages is connected to the base of the medium pressure column, and the outlet of the reheating passages is connected to the intake of a second air compressor constituting said cycle compressor, said intake being also connected to the output of an air precompressor, said principal turbine constituting also said cycle turbine.

8. Installation according to claim 7, further comprising an apparatus for the purification of air by adsorption disposed at the output of said second air compressor.

9. Installation according to claim 7, further comprising an apparatus for the purification of air by adsorption disposed between said air precompressor and said second air compressor.

10. Installation according to claim 6, wherein the inlet of the reheating passages is connected to the head of at least one of the medium pressure column and the low pressure column, the outlet of the cooling passages being connected to the double column via an expansion valve.

11. Installation according to claim 10, further comprising a refrigeration group for precooling a portion of the cycled nitrogen disposed at the output of the final said cycle compressor.

* * * * *